May 20, 1958     D. E. GOMMEL     2,835,024
SAW
Filed Sept. 23, 1953     2 Sheets-Sheet 2
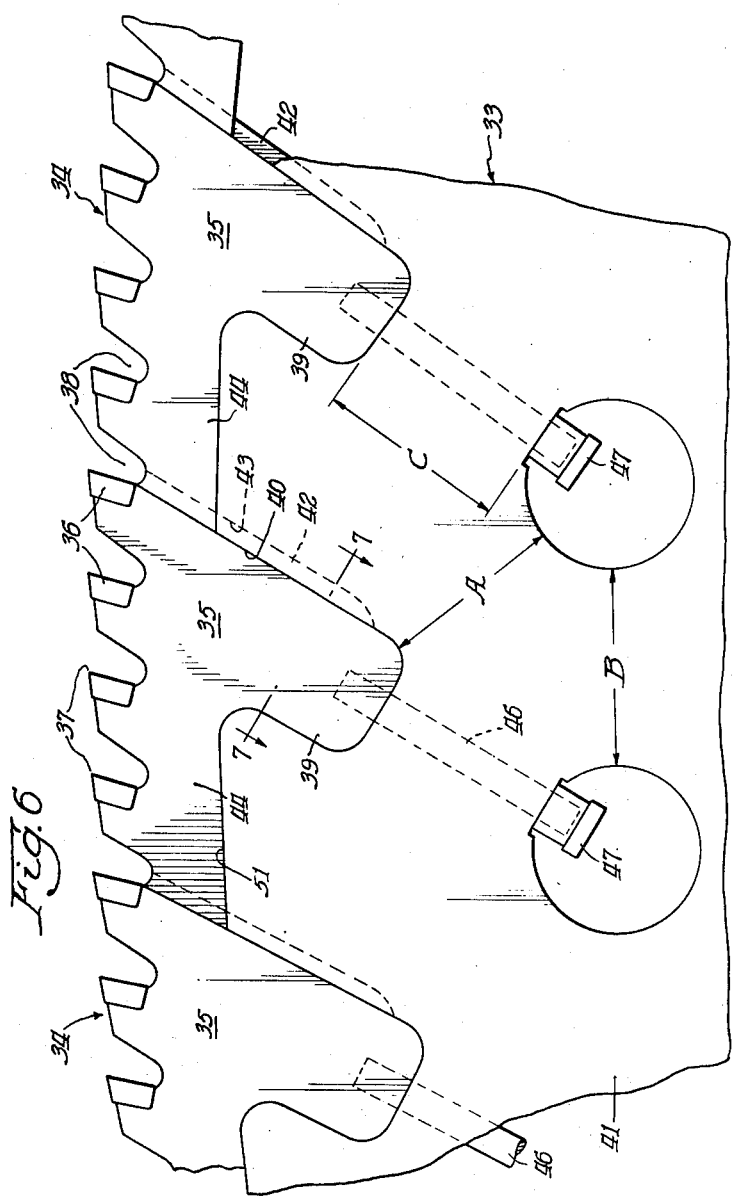
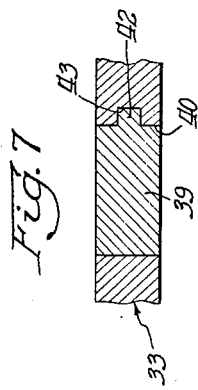
Inventor:
Dewey E. Gommel
By:
H. J. Schmid Atty.

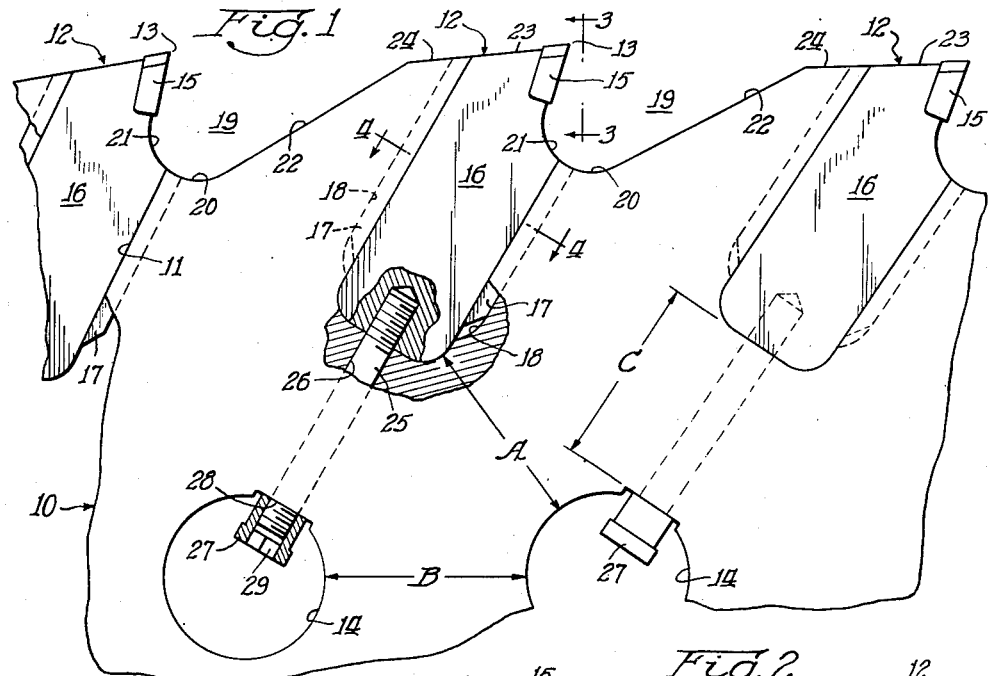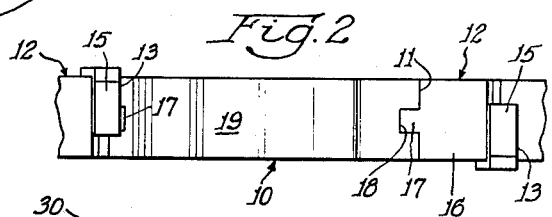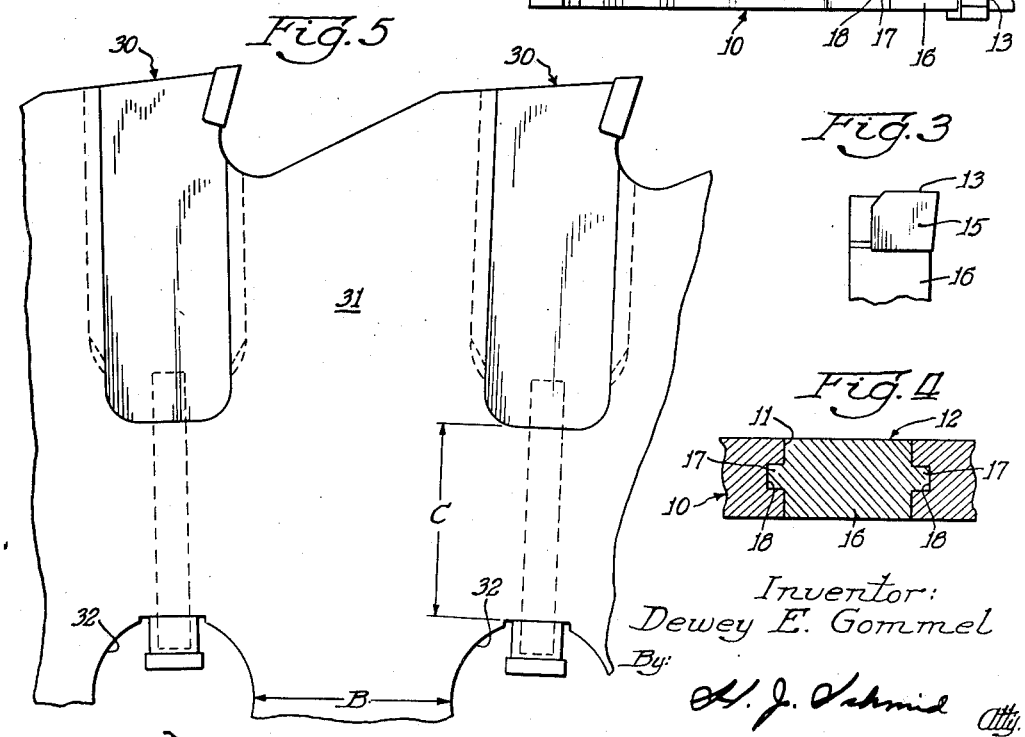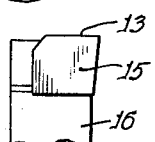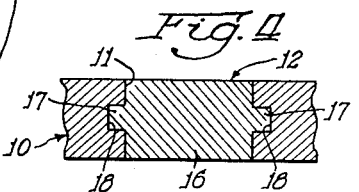

United States Patent Office 2,835,024
Patented May 20, 1958

2,835,024

SAW

Dewey E. Gommel, Indianapolis, Ind., assignor to Borg-Warner Corporation, Chicago, Ill., a corporation of Illinois Application September 23, 1953, Serial No. 381,803

2 Claims. (Cl. 29—105)

This invention relates to saws, and more particularly to saws having insertible saw teeth.

An object of the invention is to provide an insertible tooth saw having an improved attachment of the teeth and saw blade.

Another object of the invention is to provide an improved insertible tooth saw having means for quickly and easily assembling and disassembling the teeth and the saw blade.

Another object of the invention is to provide an improved insertible tooth circular saw having insertible teeth interchangeable for all diameters of saws.

Another object of the invention is to provide an improved circular saw of the inserted tooth type having a saw blade and teeth formed and arranged for assembly and disassembly without alteration of the tension of the saw blade.

Another object of the invention is to provide an improved circular saw of the insertible tooth type having means providing for worn or damaged teeth to be quickly disassembled from the saw blade and new or resharpened teeth assembled with the saw blade without warping or otherwise altering the tension of the saw blade and when the blade is connected to the saw-rotating machine.

A further object of the invention is to provide an insertible tooth saw having a circular saw blade provided with a peripheral series of outwardly-opening tooth sockets, a series of perforations radially inwardly of the sockets forming tension stabilizing holes, and radially extending passages for receiving fastening elements connected to and securing the teeth in the sockets and extending into the perforations.

Other objects of the invention will become apparent from the following description of the forms illustrated in the accompanying illustrative drawings, wherein:

Fig. 1 is a fragmentary elevation of a circular saw embodying the invention;

Fig. 2 is an edge view of the saw shown in Fig. 1;

Fig. 3 is a view taken substantially on line 3, 3 of Fig. 1, and looking in the direction of the arrows;

Fig. 4 is the section taken substantially on the line 4, 4 of Fig. 1;

Fig. 5 is a fragmentary elevation of another circular saw embodying the invention;

Fig. 6 is a fragmentary elevation of a circular saw illustrating a further embodiment of the invention;

Fig. 7 is a section taken substantially on line 7, 7 of Fig. 6.

Referring more particularly to the drawings, and to Figs. 1 to 4 thereof, the fragment of a circular saw illustrated comprises a circular saw plate, disc, or blade 10 having a portion of its peripheral region formed to provide peripherally-spaced sockets or recesses 11, each socket having a generally radially opening mouth interruting the rim or edge of the blade. The removable tooth 12 is received within each socket 11, each tooth being formed with a cutting tip 13 disposed in the active periphery of the saw. The saw blade 10 also is provided with a series of apertures or holes in the form of perforations 14 in a circular rank, the centers of all of the perforations being located upon a common circle concentric with the common circle on which the tips of the teeth 13 are located, and the angular spacing between adjacent perforations in the series being equal to the angular spacing between adjacent sockets with the perforations being staggered relative to the sockets. These perforations 14 in the blade are formed and arranged in the blade and with respect to the teeth in a manner more particularly described in U. S. Patent No. 2,609,017 issued to William R. Chapin on September 2, 1952, and for the purpose described in said patent, including the function of providing tension stabilizing holes. The perforations 14 also have a further purpose as will be presently described.

The teeth 12 comprise tool bits 15, preferably formed of carbide, having the cutting tips 13, and also the tool bit holders 16. The holders 16 are of elongated block form, and are positioned within the sockets 11 of the blade. The holders have outwardly-facing opposite parallel sides in the respective planes of the saw blade 10, and the sides of the holders within the blade sockets are provided with projections, in the form of tongues or ribs 17, received within grooves 18 in the adjacent front and rear walls of the blade sockets to slidably guide the teeth and to position the teeth in place in the blade and to prevent lateral movement of the teeth relative to the blade. The sides of the holders, radially inwardly of the tongues 17, are provided with flat surfaces, and these surfaces and the radially inner ends of the holders meet in curves or arcs and engage complementary surfaces on the blade sockets. A gullet 19 is provided between adjacent teeth by an arcuate surface 20 on the blade rim merging with a curved surface 21 on the holder and flat surface 22 on the blade rim. The radially outer end of the holder 16 is provided with a flat surface 23 merging with a flat surface 24 of the blade, which is angularly related to and terminates at the flat surface 22 of the blade.

The tool holders, and their bits, are securely held in place in the blade by forming screw-threaded openings in the radially inner portions of the holders for receiving and engagaing the threads on studs or bolts 25, the bolts extending through cylindrical passages or bores 26 in the portions of the blade between the sockets 11 and perforations 14 with the ends of the bolts projecting into the perforations 14 and having screw threaded engagement with nuts 27 rotatable to engage flattened blade portions 28, partly defining the perforations 14 of the blade, and to firmly draw and securely hold the tool bits in the blade sockets. The nuts 27 are of such a size that they do not extend beyond the sides of the saw blade, and have their radially inner ends formed with hexagonal openings 29 for receiving a tool for rotating the nuts in the assembly and disassembly of the teeth and blade.

Referring to Fig. 5 illustrating another circular saw embodying the invention, the teeth 30 of the circular saw are similarly held in, and secured to, the saw blade 31 as described with respect to the saw of Figs. 1 to 4 inclusive. The circular saw of Fig. 5 is shown to illustrate the features that the teeth 30 and sockets of the blades 31 may be disposed in radial planes while utilizing the tension-stabilizing perforations 32, whereas the teeth 12 and sockets 11 of the blade 10 are disposed in planes offset from and not intersecting the axis of the saw. It will be apparent from inspection and comparison of Figs. 1 and 5 that a much heavier backing of the metal of the blade is provided for the teeth 30 of the saw in Fig. 5, than that which, though adequate, is provided for the teeth 12 of the saw of Fig. 1.

Referring to Figs. 6 and 7, the circular saw 33 illustrates a further modification of the invention wherein a series of toothed segments or teeth 34 comprise tool bit holders 35 carrying bits 36 having cutting edges 37 and separated by gullets 38, each holder having radially-spaced ends engaging the adjacent ends of the holders circumferentially spaced therefrom. More particularly, each holder comprises a radially-extending portion or shank 39 received within sockets 40 in the blade 41, interrupting the rim or peripheral edge of the blade. The right edge of the holder is provided with a tongue 42 received within a groove 43 in one of the socket-defining walls of the blade. Each holder further comprises a circumferentially-extending portion 44, provided with a plurality of tool bits or cutters 36, and having a groove in the left edge for receiving the tongue 42 on the following holder. It will be noted that the circumferentially-extending portions 44 of the holders engage and are tightly held against the edges of the circumferentially-spaced peripheral portions 51 of the saw blade. The design and arrangement of the holders and blade will insure the holders, and their bits, being held in proper relation to each other, and in the sockets in the blade, by the bolts 46 and nuts 47, the bolts having their radially outer ends extending into and being firmly fixed within the shanks 39 of the teeth, and extending through passages in the portions of the saw blade between the sockets and the stabilizing holes for attachment of the nuts to the threaded radially inner ends of the bolts, as shown in Fig. 6, rotation of the bolts causing the holders to be drawn into the positions shown in Fig. 6 with each of the teeth cooperating with each other, and the blade to hold the teeth firmly in the blade due to the interconnection of the bit holders and blade by the engaging tongue and groove portions thereof.

It will be noted from an inspection of the drawings, for example, Fig. 2, that the carbide tool bits on the tool holders are alternately staggered circumferentially of the saw to project beyond the sides of the saw to provide a substantially wider saw kerf than the width of the saw blade. It is within the contemplation of the present invention that other and alternative securing means for the tool bit holders may, if desired, be connected to the sides of the holders, extend along the sides of the blade in planes between the blade sides and the lateral projecting portions of the tool bits, and into the perforations in the blade.

An important advantage of the saws of the present invention over previously known inserted tooth saws, is the fact that the construction of the tool holders, their cooperation with the sockets in the saw blade, and attachment to the blade, does not create or alter the rim tension in the saw blade. This feature is of considerable importance in the saw art as, in saws previously known, it was customary to use screws, pins, etc. inserted between the tool holders and the saw blade, which caused warping and alteration of the tension of the saw blade, requiring re-tensioning of the saw, for example, by tightening or loosening the screws for this purpose.

Another important feature of the embodiments of the invention illustrated and described is that it is not necessary to remove the saws from the sawing machines to replace worn or damaged tool bits by new or resharpened tool bits, as the teeth can be removed from the saw plate for replacement by new teeth, or to grind the worn tool bits to sharpen the same on a toolroom surface tool grinder, while the saw blade is maintained in the sawing machine and without the necessity of tearing down the machine to remove the saw blades as required in conventional prior practice. As an illustration of the practicality of applicant's invention, saws of the inserted tooth type may have a diameter of ninety-six inches (96"), and it has been required, in conventional practice, to remove the saw from the saw machine for the purpose of sharpening the teeth as the teeth could not be removed from the saw in the user's saw mill, metal-cutting and shaping factory, etc., who employed expensive heavy special tool grinders to sharpen the teeth, which was requiring the services of a skilled mechanic, or the same may be sent to a shop for sharpening. However, in saws of the present invention, teeth can be readily removed from the saw for reconditioning and resharpening on a toolroom surface tool grinding machine, or to insert new or sharpened teeth, without requiring removal of the saw from the sawing machine. Thus, the cost of maintenance of saws of the present invention is considerably less than prior inserted tooth saws.

Considerable flexibility in the type of the bit to be used in the saw blades is provided by utilizing embodiments of the present invention. The tool bits of any of the embodiments shown may be set at any hook angle, positive or negative, and it is only necessary to change the tool holders having tool bits of one hook angle for tool holders having the desired correct hook angle tool bits. Thus, if one of the embodiments of the saws was utilized at a saw mill, it is only necessary to have a supply of tool bits having a plurality of different hook angles, either positive or negative, for replacement in the saw blade for different types of cutting operations for shaping metal or wood.

In the use of the saws embodying the invention, the same tools are used for machining uniform sockets in the saw blades, and the tool holders, for all gauges of saws, in view of the fact that the sides of the tool holders and the sockets in the saw blade are straight, and thereby straight machining, embodying a tongue and groove configuration, can be used in easily and quickly machining the sockets in the saw blade and for shaping the tool holders.

Saw blades of the inserted tooth type embodying the present invention have considerable strength due to the mass of material and its disposition relative to the openings of the saw blade and the sockets in the saw blade, as evidenced by the fact that the distance A is equal to the distance C in the different embodiments of the invention illustrated in Figs. 1 and 6. Also, there is a better balance of material as the distances B between the stabilizing holes in the saw blade are greater than the distances C between the stabilizing holes and the radially inner ends of the sockets, which equalizes the mass of material between the perforations in the saw blade to give a better balance of the material of the saw blade.

A further feature of the invention, is that the tool holders are interchangeable for all diameters of saws, this feature being of considerable value in that the tool holders having tool bits that have the desired negative or positive hook angle, may be transferred from one diameter of saw to a different diameter of saw.

I claim:

1. A circular saw comprising, in combination, a substantially circular disc having a predetermined thickness and including means defining a plurality of generally radially outwardly opening and uniformly spaced sockets disposed around the periphery of said disc, each of said socket defining means having leading and trailing grooved walls, a plurality of toothed elements having substantially the same thickness as said disc, each of said toothed elements respectively disposed in one of said spaced sockets, each of said toothed elements having leading and trailing edges formed with projections thereon complementary respectively to said socket grooved walls for maintaining alignment of the toothed elements in said sockets, said disc including means defining a plurality of apertures extending laterally through said disc and arranged in concentric relation with respect to said sockets, each of said apertures respectively corresponding with one of said sockets, said disc including means defining a plurality of generally radially outwardly directed cylindrical bores having a diameter less than the thickness of said disc, each of said bores extending between one of said apertures and one of said sockets, a plurality of studs disposed respectively in said bores, each of said studs respectively connected with one of said toothed elements and extending into one of said apertures, and a plurality of threaded nuts disposed in said apertures, each of said nuts and having threaded engagement with one of said studs for holding one of said toothed elements in the respective socket, the diameter of said nuts being less than the thickness of said disc whereby the nuts do not project beyond the sides of said disc.

2. A circular saw comprising, in combination, a substantially circular disc having a predetermined thickness and including means defining a plurality of generally radially outwardly opening and uniformly spaced sockets disposed around the periphery of said disc, each of said socket defining means having leading and trailing walls formed with guide means thereon, a plurality of toothed elements having substantially the same thickness as said disc, each of said toothed elements respectively disposed in one of said spaced sockets, each of said toothed elements having leading and trailing edges formed with guides thereon complementary respectively to said socket wall guide means for maintaining alignment of the toothed elements in said sockets, said disc including means defining a plurality of apertures extending laterally through said disc and arranged in concentric relation with respect to said sockets, each of said apertures respectively being angularly spaced substantially medially between adjacent sockets, said disc including means defining a plurality of generally outwardly directed cylindrical bores having a diameter less than the thickness of said disc, each of said bores extending between one of said apertures and one of said sockets, a plurality of studs disposed respectively in said bores, each of said studs respectively connected with one of said toothed elements and extending into one of said apertures, and a plurality of threaded nuts disposed in said apertures, each of said nuts having threaded engagement with one of said studs for holding one of said toothed elements in the respective socket, the diameter of said nuts being less than the thickness of said disc whereby the nuts do not project beyond the sides of said disc.

References Cited in the file of this patent

UNITED STATES PATENTS

| | | |
|---|---|---|
| 368,999 | Emerson | Aug. 30, 1887 |
| 535,722 | Oldham | Mar. 12, 1895 |
| 830,778 | Geer | Sept. 11, 1906 |
| 1,278,630 | Freas | Sept. 10, 1918 |
| 2,407,921 | Deliso | Sept. 17, 1946 |
| 2,544,920 | Fullerton | Mar. 13, 1951 |

FOREIGN PATENTS

| | | |
|---|---|---|
| 50,452 | Germany | Jan. 12, 1890 |